Patented May 10, 1927.

1,628,535

UNITED STATES PATENT OFFICE.

GEORGES HONORÉ DUPONT, OF BORDEAUX, FRANCE.

PROCESS FOR THE PURIFICATION OF ABIETIC ACID.

No Drawing. Application filed April 23, 1925, Serial No. 25,434, and in France April 28, 1924.

Abietic acid obtained by any method starting from the resins of coniferous trees can be purified in the following manner.

The raw acid, dissolved in any suitable solvent, is transformed into an insoluble salt in this solvent and is separated out from the mother-liquor either by drying or by pressure or by any other suitable means. The operation is carried out for example in the following manner:

The raw abietic acid is taken in an alcoholic solution. This abietic acid might moreover advantageously have been formed in the solvent itself, starting with an alcoholic solution of colophony, which has been heated with the necessary percentage of hydrochloric acid for a sufficient period of time to cause ebullition.

After neutralization, if necessary, of the mineral acid contained in the solution, there is added the exact quantity of soda which is necessary in order to neutralize one fourth part of the abietic acid in solution; there is formed almost immediately a very abundant precipitate of fine needles of an acid salt of the abietic acid. This salt, being practically insoluble in alcohol, the solution sets in a mass; it is therefore possible by pressure or by a drying operation to separate the salt from the mother liquor which latter takes away with it all the impurities contained in the original resin as well as the salts of acids other than abietic acid.

In the operation described above, the soda could be replaced by various other alkalies (potash, ammonia and the like) or by their carbonates, and the alcohol could be replaced by a suitable solvent.

Where the raw abietic acid is formed by heating an alcoholic solution of colophone with hydrochloric acid the hydrochloric acid acts as an isomerizing catalyzer for the various resinic acids contained in the colophony and this isomerizes resinic acids into abietic acid.

The quantity of raw abietic acid in solution can be ascertained from the amount of colophony used since the raw abietic acid is produced by the mere isomerization of the initial resinic acids.

The quantity of alkali necessary to be added will be the amount necessary to neutralize the amount of acid which has been added (the weight of which latter is known) plus one-fourth part of the alakali necessary to neutralize the colophony used as the starting material. The latter quantity of alkali may be determined by the quantity of alkali required to neutralize a given weight of the colophony which is to be dissolved in alcohol with respect to phenolphthalein, and then determining from this one-fourth part of the amount of alkali necessary to neutralize all of the colophony used.

The abietates thus obtained can be utilized, in the form in which they are produced, for various purposes. Under the action of strong acids they permit of regenerating a pure abietic acid which is very slightly coloured.

On the other hand, when completely saponified by soda they give a resin soap having a faint colour and which does not become sticky.

I claim:

1. A process for purifying abietic acid, consisting in dissolving raw abietic acid in a solvent thereof, adding to the solution a quantity of an alkali sufficient to neutralize exactly one fourth of the raw abietic acid contained in the solution and in separating from the solution the acid abietate thus formed.

2. A process for purifying abietic acid, consisting in dissolving raw abietic acid in a solvent thereof, adding to the solution a quantity of an alkali sufficient to neutralize exactly one fourth of the raw abietic acid contained in the solution, separating from the solution, the acid abietate thus formed, and treating said acid abietate by an acid stronger than abietic acid.

GEORGES HONORÉ DUPONT.